May 14, 1957 R. P. FRANKLIN 2,791,984
AUTOMATIC PET FEEDER
Filed July 13, 1956 2 Sheets-Sheet 1
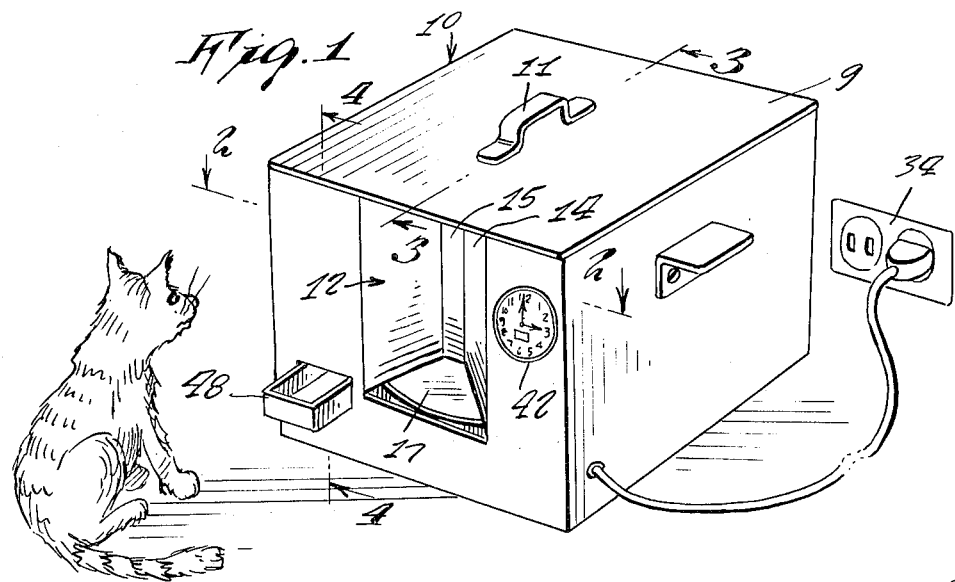
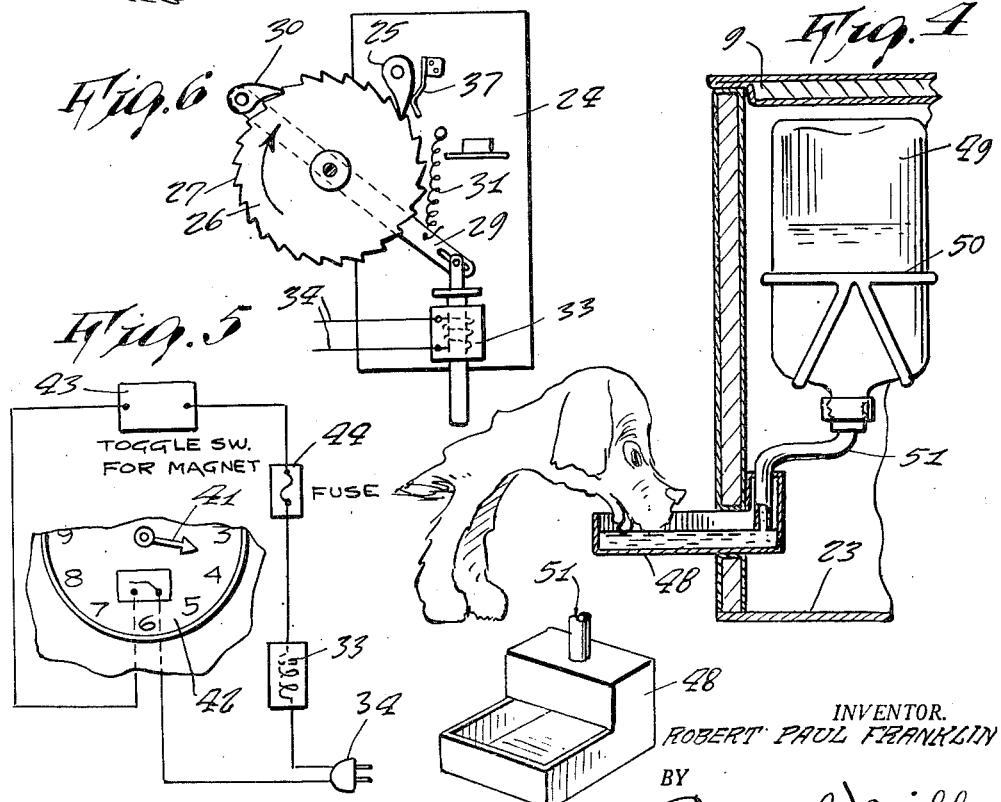
INVENTOR.
ROBERT PAUL FRANKLIN
BY
Carl Miller
ATTORNEY May 14, 1957 R. P. FRANKLIN 2,791,984
AUTOMATIC PET FEEDER Filed July 13, 1956 2 Sheets-Sheet 2

INVENTOR.
ROBERT PAUL FRANKLIN
BY
Carl Miller
ATTORNEY

United States Patent Office 2,791,984
Patented May 14, 1957

2,791,984

AUTOMATIC PET FEEDER

Robert Paul Franklin, Elkhart, Ind.

Application July 13, 1956, Serial No. 597,700

4 Claims. (Cl. 119—51)

This invention relates to pet feeders and, more particularly, to food dispensing devices for animals that are automatic and do not require constant attention.

Ordinarily, the owners of pets find it quite difficult to leave the pets alone over a period of a few days, whereby it is quite difficult for these individuals to go any place without also taking their pets with them. An object of this invention, therefore, is to provide an automatic feeding device for pets that is simple in construction, efficient in operation, and which will automatically dispense food and water to pets at spaced intervals throughout a day, for several days at a time.

A still further object of this invention, is to provide a portable, self-contained, automatic pet feeding device having automatic means for dispensing food to pets at periodic intervals, also having cooling means contained therein to prevent spoilage of the food.

Still another object of this invention, is to provide an automatic pet feeding device that contains a plurality of food trays that are adapted to be placed in registry with a feeding portion of the device, in response to actuation of a clock controlled, adjustable, device.

All of the foregoing and still further objects and advantages of this invention, will become apparent from a study of the following specification, taken in connection with the accompanying drawing, wherein:

Figure 1 is a perspective view of an automatic pet feeder made in accordance with this invention;

Figures 2, 3, and 4, are cross-sectional views taken along lines 2—2, 3—3, and 4—4, respectively, of Figure 1;

Figure 5 is a diagrammatic showing of a circuit used in connection with this invention;

Figure 6 is a bottom plan view of the actuating mechanism as viewed along line 6—6 of Figure 3;

Figure 7 is a perspective view of a trough used in accordance with this invention.

Figure 2:
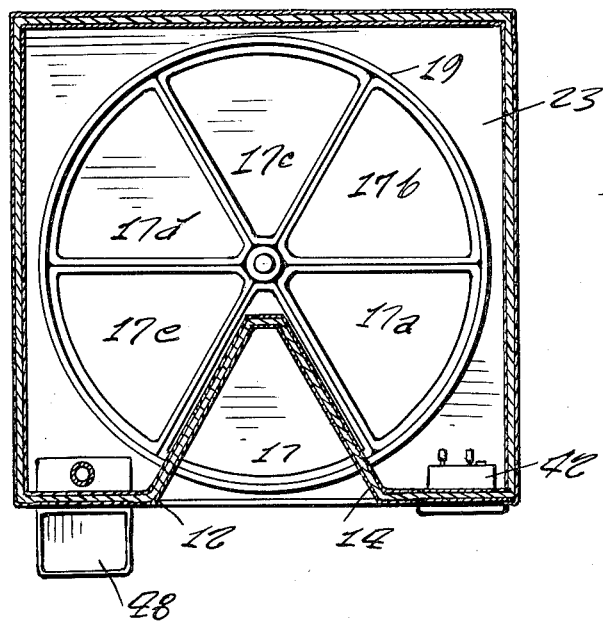
Figure 3:
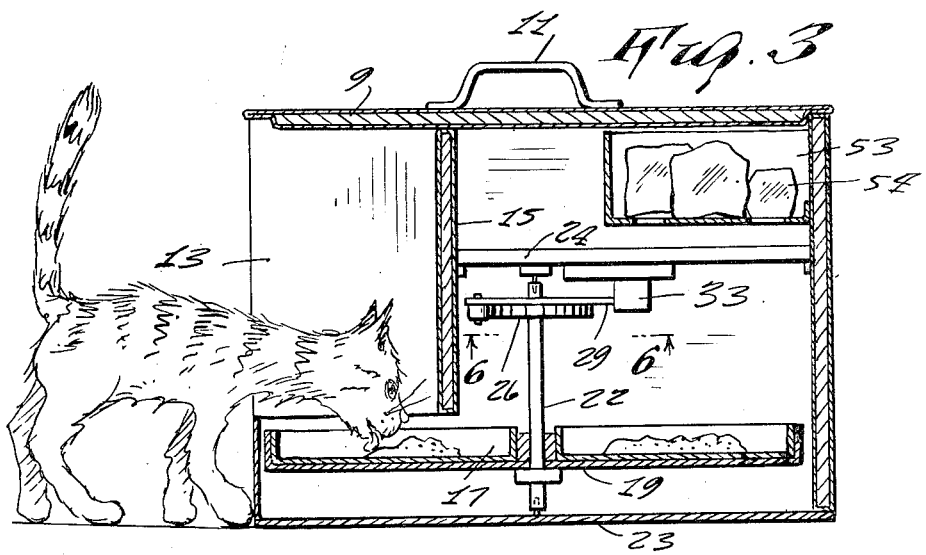
Figure 8:
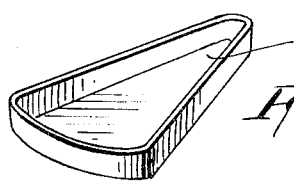
Figure 8 is a perspective view of a liquid dispensing compartment.

Referring now to Figure 1 of the drawing, a feeder cabinet 10 of an automatic feeder device made in accordance with this invention, is shown to have an insulated cover 9 that is removable by means of a handle 11 secured thereon. At the front side of the insulated cabinet is a feeding station 12 that is recessed into the cabinet and is bounded by sides 13, 14, tapering inwardly towards the center of the cabinet and terminating in a medial transverse partition 15. A single feeding tray 17 carried on a circular revolving tray 19 having a plurality of such trays 17a, 17b, 17c, 17d, 17e, is accessible from the front of the feeding station, whereby an animal or pet, such as a cat or a dog may eat the food contained therein as shown in Figure 3. The circular tray is divided into six sections by means of partitions 20, each section of which is adapted to position and contain one of the individual food trays 17. The circular tray 19 is supported for rotation relative to the cabinet 10 by means of a vertical shaft 22 rotatably supported on the floor 23 and rotatably engaged with a bearing portion depending from a horizontal ledge or shelf 24, as clearly shown in Figure 3. A ratchet wheel 26 is keyed to the upper portion of the shaft 22 and is provided with a plurality of teeth 27. An elongated horizontal lever 29 rotatably supported above the ratchet wheel on the shaft 22 has an actuating pawl 30 pivotally engaged at one end thereof and a compression spring 31 disposed adjacent to the opposite end thereof which also is pivotally engaged with the plunger 32 of an electrical relay 33. The relay is adapted to be energized from a source 34, whereupon the lever 29 is rotated to the position shown in Figure 6, which rotation is adapted to effect similar rotation of the shaft 22 and attached circular tray 19, such rotation being sufficient to rotate the tray 19 an amount to move the next feeding tray 17a into registry with the feeding station. When the relay 33 is deenergized, the spring 31 is operative to rotate the lever 29 counterclockwise as viewed in Figure 6, the check pawl 35 under the action of the lead spring 37 being adapted to engage the ratchet teeth 27 and prevent corresponding rotation of the shaft 22. The lever, in its returned position, being adapted to effect rotation of the shaft 22 again in response to energization of the relay 33.

Referring now to Figure 5 of the drawing, a pressure sensitive switch 40 is shown mounted beneath the hour hand 41 of a clock 42, and is adapted to be moved into circuit closing position in response to engagement therewith by the hour hand 41. Also included in the circuit, is a toggle switch 43 for manually deenergizing the entire system, together with a fuse 44 to deenergize the circuit in case of emergency, such as a short circuit.

As is more clearly shown in Figures 4 and 7, a drinking tray 48 is removably received within a matching opening in the front of the cabinet 10 and is adapted to be supplied with liquid such as water from a bottle 49 carried in a rigid harness support frame 50 within the insulated cabinet, through a flexible tube 51 communicating therewith. The cabinet also includes a compartment 53 that is adapted to receive and store a quantity of Dry Ice 54 that is adapted to maintain the contents of the cabinet at a desirable low temperature. Of course, the entire cabinet 10 is adapted to be moved by means of handles 56 from one location to another, so that it is completely portable and may be placed in any desired position.

In operation, the clock 42 which may be electrical or manually spring wound, is set in a conventional manner. Thereafter, each time the hour hand 41 passes over the number "6," it is operative to close the energizing circuit for the relay 33, whereupon the plunger 32 is operative to effect rotation of the lever 29 a distance sufficient to rotate the circular tray 19 one-sixth of a revolution so as to bring the next subsequent feeding tray 17a into registry with the feeding station. It is to be understood, therefore, that during the course of a single day the hour hand 41 will pass into closing engagement with the switch 40 two times, whereupon the pet may be fed twice each day. Inasmuch as there are six trays carried by the circular table, sufficient food may be placed within the feeder to feed the pet twice each day for three days.

While this invention has been described with particular reference to the specific forms shown in the drawing, it is understood that such is not to be construed as imparting limitations upon the invention, which is best defined by the claims appended hereto.

Having thus described my invention, I claim as new and desire to secure by Letters Patent:

1. An automatic food storage and dispensing device for pets comprising, in combination, an insulated cubicle cabinet, a feeding station disposed at the lower front side of said cabinet having a pair of vertical and inwardly converging sides connected at their inner ends by a transverse vertical medial wall, a circular tray rotatably supported within said cabinet adjacent to the bottom thereof for rotation in a horizontal plane, a plurality of similar equally spaced food containers supported upon said tray, one of said containers being in accessible registry with said feeding station at all times, the other of said containers being housed within said cabinet, refrigeration means carried within the upper rear portion of said cabinet in cooling relationship with said other containers, mechanical means for selectively rotating said circular tray, a predetermined amount to sequentially bring each of said containers successively into registry with said feeding station, electrical means for actuating said mechanical means, and automatic time control means for energizing said electrical means.

2. An automatic food dispensing device as set forth in claim 1, wherein said mechanical means comprises a vertical shaft extending through and rigidly secured to the center of said circular tray, said shaft being rotatably engaged at its lower extremity with said cabinet and its upper extremity with a transversely extending shelf disposed within said cabinet immediately behind said feeding station, a ratchet wheel keyed to the upper end of said shaft, an elongated lever rotatably carried above said ratchet wheel on said shaft having pivotally mounted pawl means adjacent one end thereof and being engaged with a reciprocating plunger at its opposite end, said plunger being adapted to be energized by an electrical source so as to reciprocate said lever about its pivotal connection to said shaft, whereby said pawl is operative to engage and rotate said ratchet wheel during movement in one direction relative thereto.

3. An automatic food dispensing device as set forth in claim 2, wherein said electrical means comprises an electrical relay, said plunger being adapted to be energized by said relay to urge said lever in one direction, and spring means associated with said lever to urge said lever in an opposite direction in response to deenergization of said relay.

4. An automatic food dispensing device as set forth in claim 3, wherein said automatic time control means comprises a clock having an hour hand, electrical switch means carried by said clock adjacent one portion thereof adapted to be moved into circuit closing relationship in response to engagement therewith by said hour hand, said switch being adapted to be moved into circuit opening position upon disengagement of said hour hand therewith.

References Cited in the file of this patent
UNITED STATES PATENTS

| | | |
|---|---|---|
| 2,500,243 | Dixon | Mar. 14, 1950 |
| 2,528,742 | Coffing | Nov. 7, 1950 |
| 2,701,548 | Wolfe | Feb. 8, 1955 |